United States Patent
Fujii et al.

(10) Patent No.: US 8,126,194 B2
(45) Date of Patent: Feb. 28, 2012

(54) DIGITAL WATERMARK EMBEDDING APPARATUS, DIGITAL WATERMARK DETECTING APPARATUS, AND DIGITAL WATERMARK SYSTEM

(75) Inventors: Ryousuke Fujii, Tokyo (JP); Tokumichi Murakami, Tokyo (JP); Koutarou Asai, Tokyo (JP); Mitsuyoshi Suzuki, Tokyo (JP); Hiroshi Itou, Tokyo (JP); Koichi Magai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 867 days.

(21) Appl. No.: 12/097,051

(22) PCT Filed: Dec. 1, 2006

(86) PCT No.: PCT/JP2006/324061
§ 371 (c)(1),
(2), (4) Date: Aug. 14, 2008

(87) PCT Pub. No.: WO2007/069475
PCT Pub. Date: Jun. 21, 2007

(65) Prior Publication Data
US 2009/0202103 A1    Aug. 13, 2009

(30) Foreign Application Priority Data

Dec. 13, 2005   (JP) .................................. 2005-358546

(51) Int. Cl.
*G06K 9/00* (2006.01)
(52) U.S. Cl. ...................................................... 382/100
(58) Field of Classification Search .................... 382/100
See application file for complete search history.

(56) References Cited

U.S. PATENT DOCUMENTS

| | | | |
|---|---|---|---|
| 2001/0054150 A1* | 12/2001 | Levy | 713/176 |
| 2002/0166050 A1* | 11/2002 | Takahashi | 713/176 |
| 2003/0076979 A1* | 4/2003 | Matsui | 382/100 |
| 2003/0101141 A1* | 5/2003 | Iwamura | 705/51 |

FOREIGN PATENT DOCUMENTS

| | | |
|---|---|---|
| JP | 2003 264683 | 9/2003 |
| JP | 2004 78381 | 3/2004 |

OTHER PUBLICATIONS

Kazuhiko, Yamaguchi et al., "Digital Watermarks using Error-Correcting Coding for Open Algorithm", The 1999 Symposium on Cryptography and Information Security, pp. 713-718, (1999) (with English abstract).

* cited by examiner

*Primary Examiner* — Tom Y Lu
(74) *Attorney, Agent, or Firm* — Oblon, Spivak, McClelland, Maier & Neustadt, L.L.P.

(57) ABSTRACT

The digital watermark embedding apparatus includes: a storing unit (15) for storing in advance at least one embedding function, at least one image converting program, and at least one image processing program that are required for a digital watermark embedding process, and storing in advance combination process information in which a process ID is assigned to each combination of those processing functions; an embedding process selecting unit (12) for selecting, as particular combination process information, one of a plurality of pieces of the combination process information; and an embedding unit (14) for obtaining from the storing unit (15) the embedding function, the image converting program, and the image processing program which are included in the selected particular combination process information, embedding particular embedding information into multimedia data, and generating determination information including the process ID corresponding to the particular combination process information.

9 Claims, 7 Drawing Sheets

COMBINATION PROCESS INFORMATION

| PROCESS ID | DIGITAL WATERMARK EMBEDDING | | | IMAGE CONVERTING PROGRAM | | IMAGE PROCESSING PROGRAM | |
|---|---|---|---|---|---|---|---|
| | FUNC1 | FUNC2 | FUNC3 | 1 | 2 | 1 | 2 |
| 0001 | ○ | × | × | ○ | × | ○ | × |
| 0002 | × | ○ | × | ○ | × | ○ | × |
| 0003 | × | × | ○ | ○ | × | ○ | × |
| ... | | | | ... | | | |
| 0010 | ○ | ○ | × | ○ | ○ | ○ | × |
| 0011 | ○ | ○ | × | ○ | ○ | × | ○ |
| ... | | | | | | | |

FIG. 5

PROCESS PRAMETER SET

| PROCESS PARAMETER ID | PARAMETER SET 1 | PARAMETER SET 2 | PARAMETER SET 3 | PARAMETER SET 4 |
|---|---|---|---|---|
| 0001 | ○ | × | × | × |
| 0002 | × | ○ | × | × |
| 0003 | × | × | ○ | × |
| 0004 | × | × | × | ○ |

DIGITAL WATERMARK EMBEDDING APPARATUS, DIGITAL WATERMARK DETECTING APPARATUS, AND DIGITAL WATERMARK SYSTEM

BACKGROUND OF THE INVENTION

1. Field of the Invention

The present invention relates to a digital watermark embedding apparatus for embedding particular embedding information with little adverse effect on image quality or sound quality of multimedia data such as an image, a moving image, and a sound, a digital watermark detecting apparatus for detecting the embedded particular embedding information, and a digital watermark system obtained by integrating the digital watermark embedding apparatus and the digital watermark detecting apparatus.

2. Description of the Related Art

Conventional digital watermarking of an open algorithm type enables information regarding digital watermark extraction to be made open by applying error-correction coding not only to information to be embedded but also to an entire image or an entire data group available for embedding (for example, see Yamaguchi, Iwamura, Imai, "Digital Watermark of Open Algorithm Type using Error-Correction Coding", Proceedings of the 1999 Symposium on Cryptography and Information Security, pp. 713-728, 1999).

However, the conventional technologies have the following problems. The conventional digital watermarking of an open algorithm type has required, due to the application of error-correction coding, parity bits to be embedded so as to be accurately detected in addition to information that is primarily desired to be embedded as a digital watermark. This has caused problems that embedding space for the information that is primarily desired to be embedded as the digital watermark is reduced and that degradation of image quality occurs due to embedding of the parity bits.

SUMMARY OF THE INVENTION

The present invention has been made to solve the above-mentioned problems, and has an object to provide a digital watermark embedding apparatus, a digital watermark detecting apparatus, and a digital watermark system, which enable a digital watermark embedding algorithm to be made open while minimizing degradation of image quality.

According to the present invention, a digital watermark embedding apparatus for embedding particular embedding information into multimedia data, includes: a storing unit for storing in advance at least one embedding function, at least one image converting program, and at least one image processing program that are required for a digital watermark embedding process, and storing in advance combination process information in which a process ID is assigned to each combination of the at least one embedding function, the at least one image converting program, and the at least one image processing program; an embedding process selecting unit for selecting, as particular combination process information, one of a plurality of pieces of the combination process information stored in the storing unit; and an embedding unit for obtaining the at least one embedding function, the at least one image converting program, and the at least one image processing program that are included in the selected particular combination process information, embedding the particular embedding information into the multimedia data, and generating determination information for determining a process ID corresponding to the particular combination process information.

Further, according to the present invention, a digital watermark detecting apparatus for detecting particular embedding information from multimedia data embedded with the particular embedding information by a digital watermark embedding apparatus, includes: a storing unit for storing in advance at least one detecting function, at least one image converting program, and at least one image processing program that are required for a digital watermark detecting process, and storing in advance combination detection information in which a detection ID is assigned to each combination of the at least one detecting function, the at least one image converting program, and the at least one image processing program in association with determination information for specifying at least one function and program used for an embedding process by the digital watermark embedding apparatus; a determination information entering unit for acquiring the determination information made at a time of the embedding process performed by the digital watermark embedding apparatus with respect to the multimedia data; a detecting process selecting unit for selecting, based on the determination information, one of a plurality of pieces of the combination detection information stored in the storing unit as particular combination detection information; and a detecting unit for obtaining, from the storing unit, the at least one detecting function, the at least one image converting program, and the at least one image processing program that are included in the selected particular combination detection information, and extracting the particular embedding information from the multimedia data.

According to the present invention, a combination of processing functions is selected to perform an embedding process of embedding information while the selected combination of the processing functions is kept secret. Only a detecting apparatus that is provided with a combination of detecting functions corresponding to the selected combination of the processing functions can perform a detecting process of the embedding information. Thus, a digital watermark embedding apparatus, a digital watermark detecting apparatus, and a digital watermark system, which enable a digital watermark embedding algorithm to be made open while minimizing degradation of image quality, can be obtained.

DETAILED DESCRIPTION OF THE PREFERRED EMBODIMENTS

Hereinbelow, preferred embodiments of a digital watermark embedding apparatus, a digital watermark detecting apparatus, and a digital watermark system according to the present invention are described with reference to the drawings.

Embodiment 1

First, a concept of the present invention is described. Digital watermark embedding according to the present invention is expressed vectorially as shown in the following equation (1):

$$X = S + Fi(W) \quad (1)$$

where: X represents an image vector after the digital watermark embedding; S represents an image vector before the digital watermark embedding; W represents information that is to be embedded as a digital watermark; and Fi represents a processing function used for the digital watermark embedding. To be more specific, Fi represents an embedding function, an image converting program, or an image processing program. It should be noted that the embedding function, the image converting program, or the image processing program may be used individually for Fi, or an arbitrary combination thereof may be used for Fi.

Figure 1:
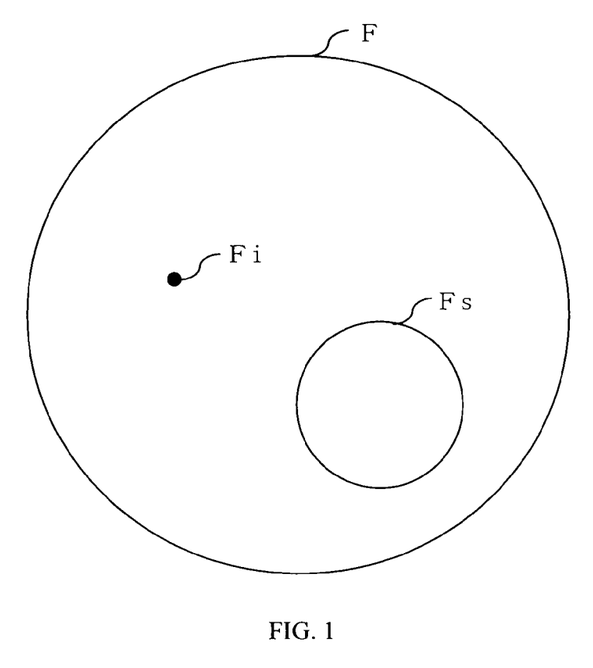
FIG. 1 is a conceptual diagram of processing functions used for digital watermark embedding according to Embodiment 1 of the present invention.

FIG. 1 is a conceptual diagram of the processing functions used for the digital watermark embedding according to Embodiment 1 of the present invention, and corresponds to a conceptual diagram of Fi(W) of the above equation (1). In FIG. 1, Fi indicates the embedding function, the image converting program, or the image processing program, which is the processing function used for the digital watermark embedding. F represents a set of the embedding functions, the image converting programs, or the image processing programs. Further, Fs represents a subset (partial set) of the set F.

Specifically, for Fi(W) of the equation (1), a single embedding function, image converting program, or image processing program (corresponding to Fi of FIG. 1), which is used for the digital watermark embedding, may be used. Alternatively, a combination of one or more embedding functions, one or more image converting programs, or one or more image processing programs, which is included in the set F of the embedding functions, image converting programs, or image processing programs, respectively (corresponding to Fs of FIG. 1), may be used.

With this configuration, any person can design, register, and use a digital watermark embedding method by making secret Fi(W) of the equation (1) while making open a set W. Specifically, alteration or deletion of embedding information can be prevented by, on one hand, making open the designing, registration, and use of the digital watermark embedding method by making open the embedding functions, the image converting programs, or the image processing programs, which are individual functions for the embedding process and, on the other hand, making secret the combination of the embedding functions, the image converting programs, or the image processing programs at a time of an actual embedding process.

Further, in a case where a parametric function is included in a part of Fi(W), making secret a parameter or parameter set to be set for the parametric function enables an even more secure digital watermarking method.

Figure 2:
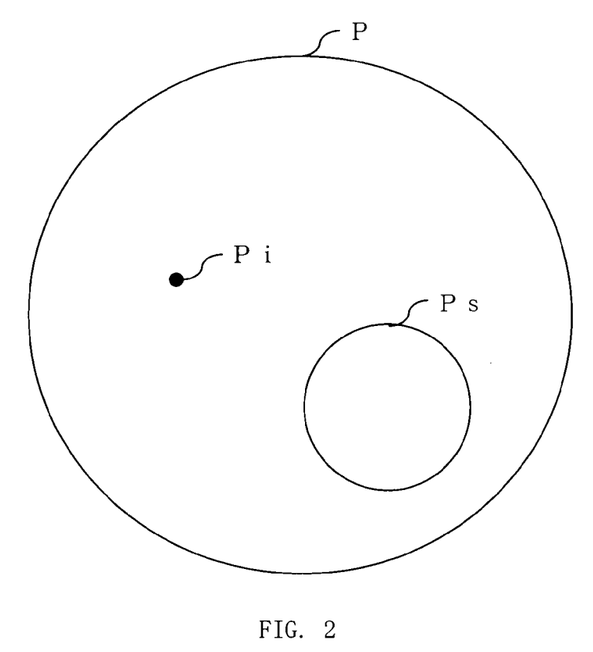
FIG. 2 is a conceptual diagram of parameters used for parametric functions for the digital watermark embedding according to Embodiment 1 of the present invention.

FIG. 2 is a conceptual diagram of parameters used for parametric functions for the digital watermark embedding according to Embodiment 1 of the present invention. In FIG. 2, Pi represents a parameter set for a parametric function used for the digital watermark embedding. In addition, P represents a set of parameters that is set for parametric functions. Further, Ps represents a subset (partial set) of the set P of parameters.

Apart from making Fi(W) of the equation (1) secret, the parameter or a combination of parameters may be made secret. Alternatively, combinations of Fi(W) and parameters may be set in advance for indexing, and the indexes may be made secret.

Figure 3:
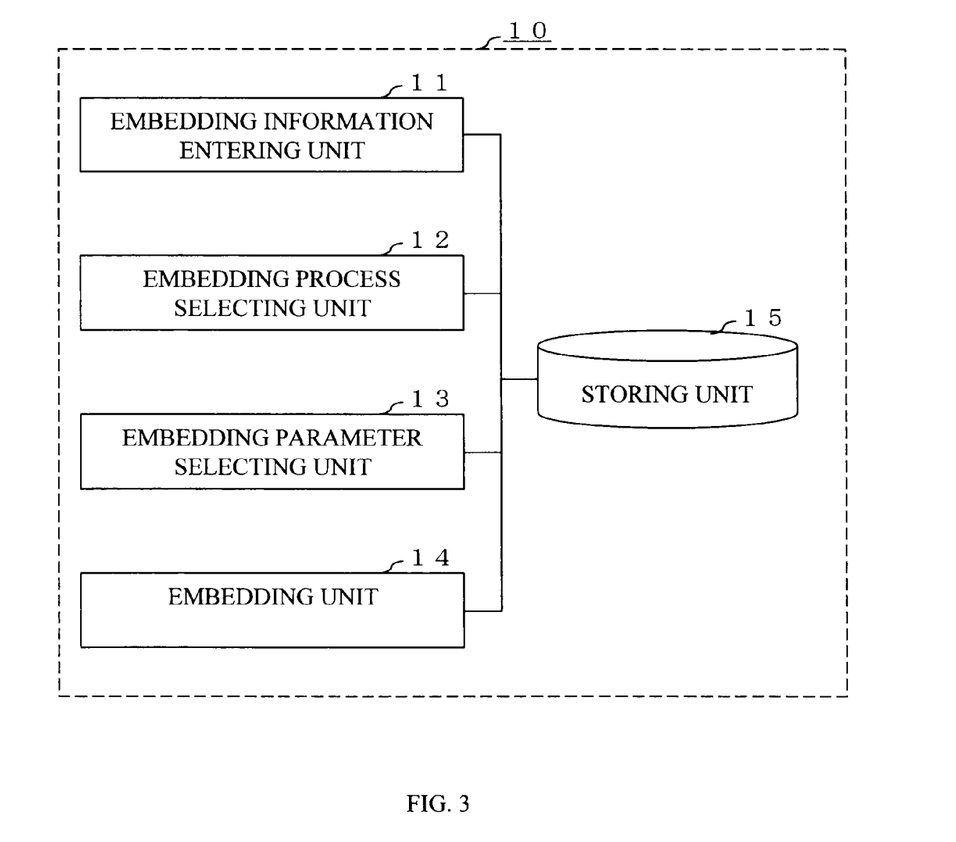
FIG. 3 is a configuration diagram of a digital watermark embedding apparatus according to Embodiment 1 of the present invention.

Based on the concept described above, the digital watermark embedding apparatus according to the present invention is first described. FIG. 3 is a configuration diagram of the digital watermark embedding apparatus according to Embodiment 1 of the present invention. A digital watermark embedding apparatus 10 of FIG. 3 includes an embedding information entering unit 11, an embedding process selecting unit 12, an embedding parameter selecting unit 13, an embedding unit 14, and a storing unit 15.

Figure 4:
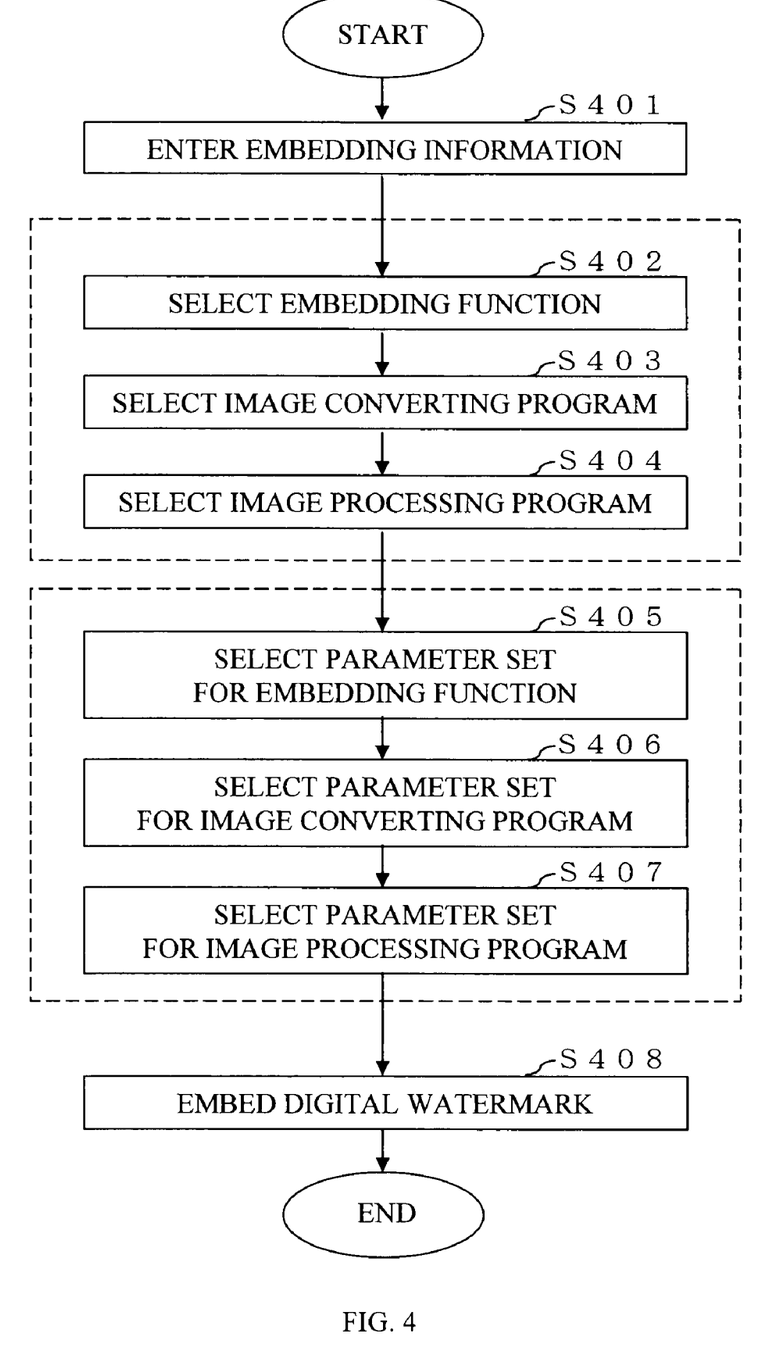
FIG. 4 is a flow chart concerning an embedding process of the digital watermark embedding apparatus according to Embodiment 1 of the present invention.

Next, the embedding process by those components is described with reference to a flow chart. FIG. 4 is a flow chart concerning the embedding process of the digital watermark embedding apparatus 10 according to Embodiment 1 of the present invention. For the embedding process, it is assumed that the storing unit 15 stores in advance the embedding functions, the image converting programs, or the image processing programs, which are used for the embedding process (in other words, corresponding to the individual elements Fi of the set F illustrated in FIG. 1).

First, the embedding information entering unit 11 reads out, as input data, embedding information that is to be embedded as a digital watermark (Step S401). Subsequently, the embedding process selecting unit 12 selects from the storing unit 15 an embedding function (Step S402), an image converting program (Step S403), and an image processing program (Step S404) in order to embed the read out embedding information as digital watermark data.

It should be noted that the option of "no selecting" may be provided at respective selection times for the image converting program and the image processing program. Also, a plurality of options that are prioritized may be selected at respective selection times for the embedding function, the image converting program, and the image processing program. For example, in a case where a plurality of image converting programs are selected, the respective image converting programs are sequentially executed according to the priorities.

Next, the embedding parameter selecting unit 13 selects a parameter set that is to be used for the function and the programs selected by the embedding process selecting unit 12. Specifically, the embedding parameter selecting unit 13 selects a parameter for the embedding function (Step S405), a parameter for the image converting program (Step S406), and a parameter for the image processing program (Step S407).

Lastly, the embedding unit 14 sets the parameters selected by the embedding parameter selecting unit 13 to the function and the programs selected by the embedding process selecting unit 12, thereby embedding the embedding information as a digital watermark (Step S408).

It should be noted that one or more digital watermark embedding functions, image converting programs, and image processing programs stored in the storing unit 15 may be stored as combination process information in which a process ID is assigned to each arbitrary combination made of one or more respective process functions. With this configuration, the selecting processes of Steps S402 to S404 by the embedding process selecting unit 12 can be performed by selecting an appropriate process ID from the combination process information stored in the storing unit 15.

Figure 5:
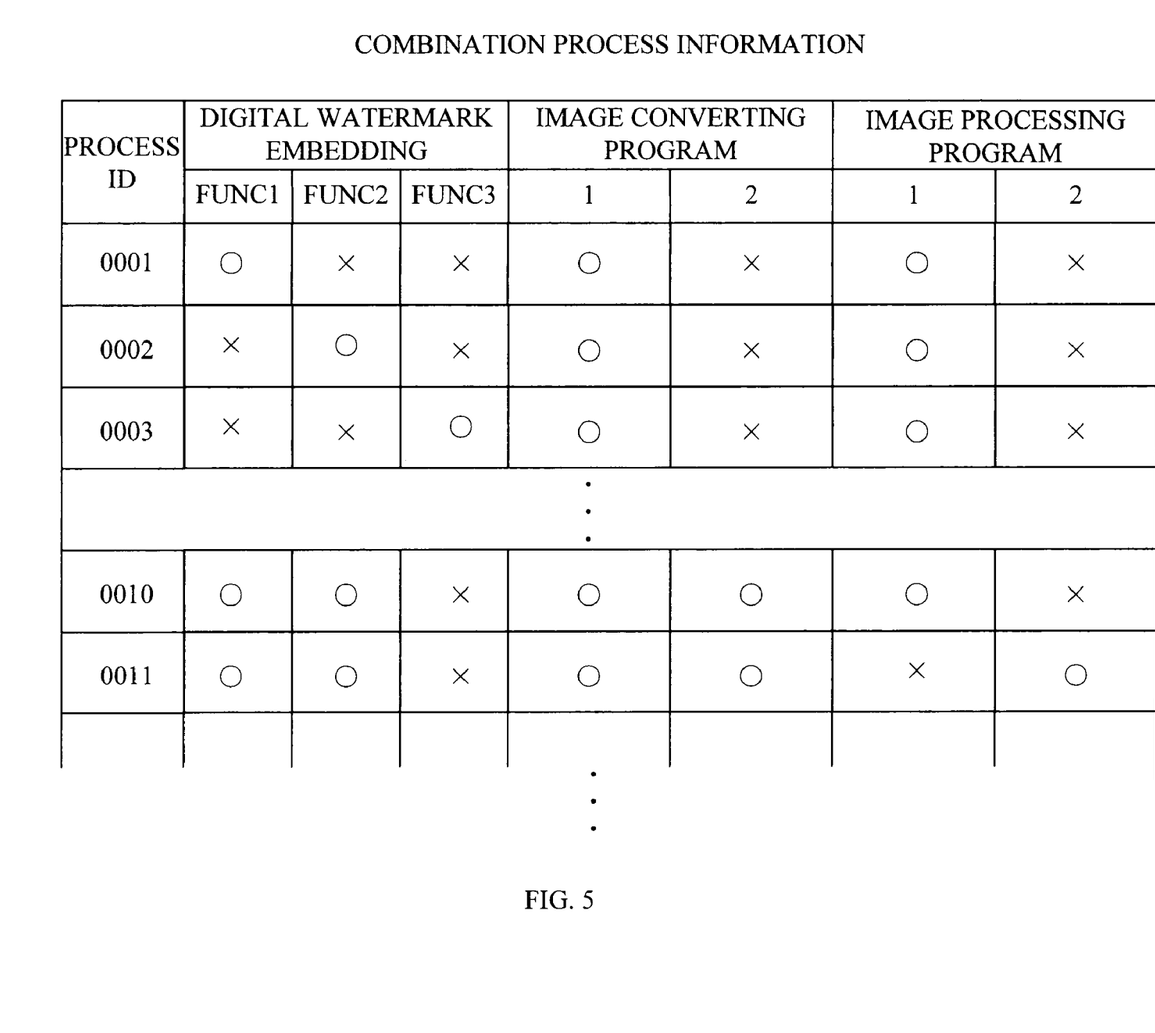
FIG. 5 is a diagram illustrating a list of combination process information stored in a storing unit of the digital watermark embedding apparatus according to Embodiment 1 of the present invention.

FIG. 5 is a diagram illustrating a list of combination process information stored in the storing unit 15 of the digital watermark embedding apparatus 10 according to Embodiment 1 of the present invention. In FIG. 5, an ID is assigned to each arbitrary combination of one or more embedding functions, one or more image converting programs, and one or more image processing programs, which are selected from three embedding functions, two image converting programs, and two image processing programs prepared in advance.

In FIG. 5, an ID 0001 represents a combination of a digital watermark embedding function 1, an image converting program 1, and an image processing program 1 that are used at the time of digital watermark embedding. An ID 0002 represents a combination of a digital watermark embedding function 2, an image converting program 1, and an image processing program 1 that are used at the time of digital watermark embedding. An ID 0003 represents a combination of a digital watermark embedding function 3, an image converting program 1, and an image processing program 1 that are used at the time of digital watermark embedding.

Further, as examples of combinations made of a plurality of options, an ID 0010 represents a combination of digital watermark embedding functions 1 and 2, image converting programs 1 and 2, and an image processing program 1 that are used at the time of digital watermark embedding. An ID 0011 represents a combination of digital watermark embedding functions 1 and 2, image converting programs 1 and 2, and an image processing program 2 that are used at the time of digital watermark embedding.

Further, one or more parameters stored in the storing unit 15 may be stored as process parameter sets in which a process parameter ID is assigned to each arbitrary combination made of one or more respective process functions. With this configuration, the selecting processes of Steps S405 to S407 by the embedding parameter selecting unit 13 can be performed by selecting an appropriate process parameter ID from the process parameter sets stored in the storing unit 15.

Figure 6:
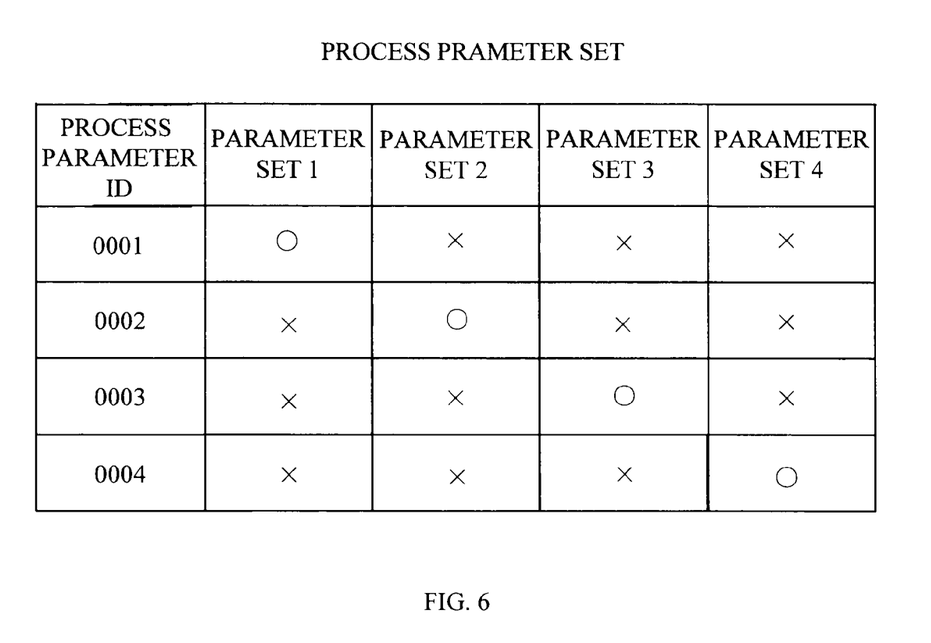
FIG. 6 is a diagram illustrating a list of process parameter sets stored in the storing unit of the digital watermark embedding apparatus according to Embodiment 1 of the present invention.

FIG. 6 is a diagram illustrating a list of process parameter sets stored in the storing unit 15 of the digital watermark embedding apparatus 10 according to Embodiment 1 of the present invention. In FIG. 6, a process parameter ID is assigned to each of parameter sets 1 to 4 which are prepared in advance. In FIG. 6, an ID 0001 to an ID 0004 are process parameter IDs each representing parameter sets 1 to 4, respectively.

In addition, the embedding unit 14 generates determination information that includes the process ID selected by the embedding process selecting unit 12 and the process parameter ID selected by the embedding parameter selecting unit 13. On the other hand, a digital watermark detecting apparatus side, which is described below, is provided in advance with detecting functions and detecting parameter sets that correspond to the determination information, which enables the digital watermark detecting apparatus side to extract the embedding information based on the determination information.

As has been described above, the digital watermark embedding apparatus side stores in advance combinations of the processing functions and the process parameters required for the embedding process while the digital watermark detecting apparatus side stores in advance combinations of the detecting functions and the detecting parameters required for the detecting process in association with the processing functions and the process parameters stored in the digital watermark embedding apparatus side.

Then, the digital watermark embedding apparatus generates combinations of the processing functions and the process parameters selected in the embedding process as the determination information. In contrast, only the digital watermark detecting apparatus that is provided with the combinations of the detecting functions and the detecting parameters that are required for the detecting process can extract a digital watermark upon acquisition of the determination information in question. As a result, even in a case where the individual processing functions are made open, alteration or deletion of the embedded digital watermark can be prevented.

As has been described above, according to Embodiment 1 of the present invention, at the time of digital watermark embedding, an arbitrary combination can be selected from among the digital watermark embedding functions, the image converting programs, and the image processing programs prepared in advance to perform the embedding process. Then, making such a combination secret makes it difficult to alter or delete the embedded digital watermark even when the individual embedding functions, image converting programs, and image processing programs that are used for the digital watermark embedding are made open.

In addition, in a case where parameters are included in the embedding functions, the image converting programs, and the image processing programs, an arbitrary parameter set may be selected, at the time of digital watermark embedding, from a plurality of parameter sets prepared in advance to perform the embedding process. Consequently, making such a combination secret makes it even more difficult to alter or delete the embedded digital watermark.

Further, the process ID may be assigned to each of the arbitrary combinations of the digital watermark embedding functions, the image converting programs, and the image processing programs prepared in advance, and may be managed. With this configuration, the selection of a combination of the processing functions is performed with ease. Further, for example, the determination information including the process ID is encrypted with a secret key, and then made open using public key cryptography. Accordingly, any person that has received a digital watermark embedding image can acquire the process ID by decrypting the determination information with the public key.

As a result, only the person that knows correspondence relations of process IDs assigned to the respective arbitrary combinations of the digital watermark embedding functions, the image converting programs, and the image processing programs prepared in advance can specify, with the decrypted process ID, the combination of the digital watermark embedding functions, the image converting programs, and the image processing programs, and detect the digital watermark embedded in the digital watermark embedding image.

Further, parameter sets for the selected function(s) and the programs may be prepared in advance, and a process parameter ID may be assigned to each of the parameter sets, thereby making the selection of a combination of parameters easier. Further, for example, the determination information including the process parameter ID is encrypted with a secret key, and then made open using public key cryptography. Accordingly, any person that has received a digital watermark embedding image can acquire the process parameter ID by decrypting the determination information with the public key.

As a result, only the person that knows correspondence relations of IDs assigned to the respective parameter sets prepared in advance can specify, with the decrypted process parameter ID, the parameter set, and detect the digital watermark embedded in the digital watermark embedding image.

Embodiment 2

In Embodiment 1, described is a digital watermark embedding apparatus that is configured to select an arbitrary combination from among digital watermark embedding functions, image converting programs, and image processing programs, which are processing functions prepared in advance, to embed a digital watermark. On the other hand, in Embodiment 2, described is a digital watermark detecting apparatus that receives an image embedded with the digital watermark according to Embodiment 1 and detects the digital watermark from the image.

Figure 7:
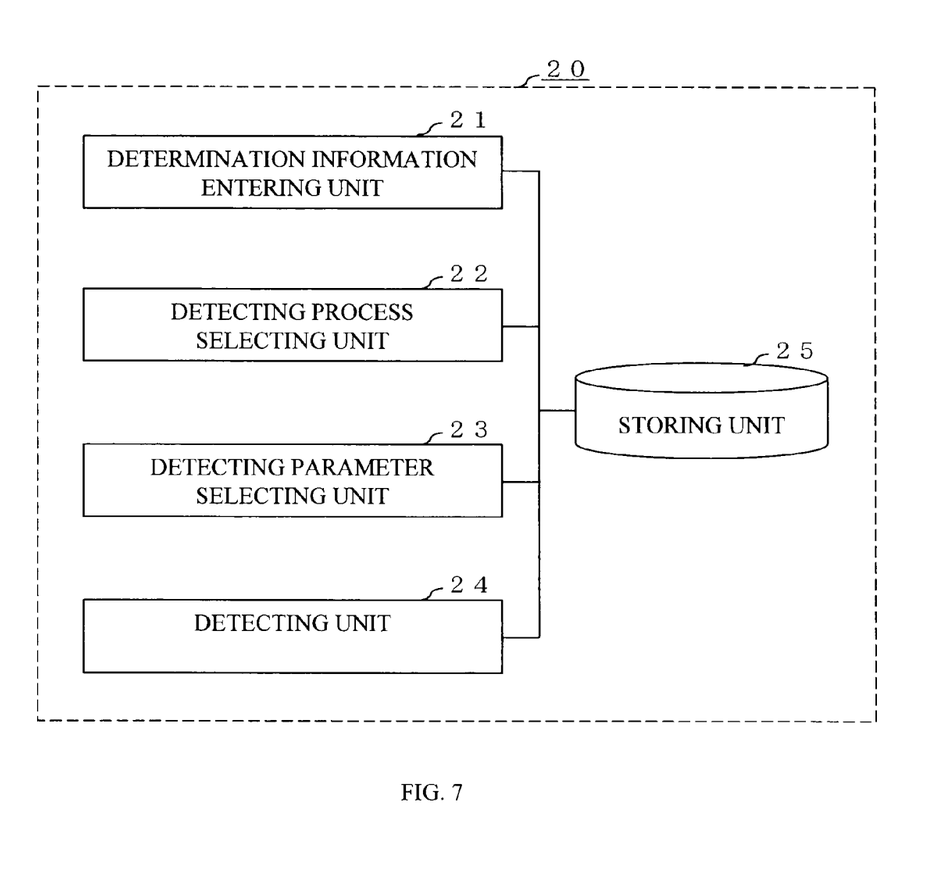
FIG. 7 is a configuration diagram of a digital watermark detecting apparatus according to Embodiment 2 of the present invention.

FIG. 7 is a configuration diagram of the digital watermark detecting apparatus according to Embodiment 2 of the present invention. The digital watermark detecting apparatus 20 of FIG. 7 includes a determination information entering unit 21, a detecting process selecting unit 22, a detecting parameter selecting unit 23, a detecting unit 24, and a storing unit 25.

Figure 8:
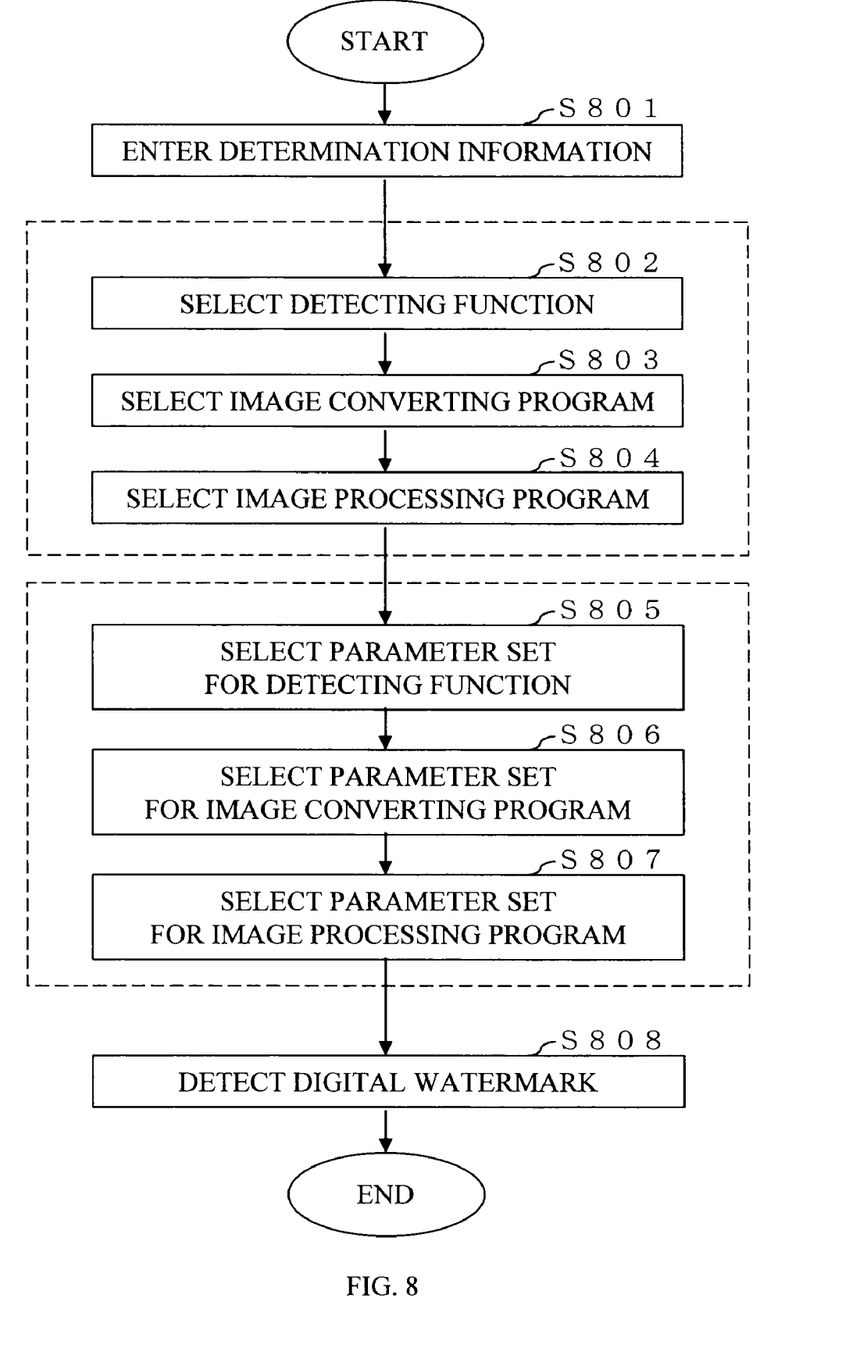
FIG. 8 is a flow chart concerning a detecting process of the digital watermark detecting apparatus according to Embodiment 2 of the present invention.

Next, a detecting process by those components is described with reference to a flow chart. FIG. 8 is a flow chart concerning the detecting process of the digital watermark detecting apparatus 20 according to Embodiment 2 of the present invention. For the detecting process, it is assumed that the storing unit 25 stores in advance detecting functions, image converting programs, or image processing programs, which are used for the detecting process in association with the embedding process of the digital watermark embedding apparatus 10 side.

First, the determination information entering unit 21 reads out, as determination information, a combination of digital watermark embedding functions, image converting programs, and image processing programs that has been used for the embedding, and information for determining a parameter set for the digital watermark embedding functions and parameter sets for the image converting/image processing programs (Step S801). Those combination and information are required for the digital watermark detecting.

This determination information may be a process ID representing a combination of the processing functions, a process parameter ID representing a process parameter set, or an ID representing both of the process ID and the process parameter ID. Also, in a case where an ID is encrypted with a secret key, the determination information entering unit 21 reads out the ID decrypted with a public key as the determination information.

Next, the detecting process selecting unit 22 selects from the storing unit 25, based on the determination information read out by the determination information entering unit 21, a detecting function (Step S802), an image converting program (Step S803), and an image processing program (Step S804), which are used for the detecting unit 24 to detect the digital watermark.

Subsequently, the detecting parameter selecting unit 23 selects from the storing unit 25 a detecting parameter set for the function and the programs selected by the detecting process selecting unit 22. Specifically, the detecting parameter selecting unit 23 selects a parameter for the detecting function (Step S805), a parameter for the image converting program (Step S806), and a parameter for the image processing program (Step S807).

Lastly, the detecting unit 24 performs the digital watermark detecting process by setting the detecting parameters selected by the detecting parameter selecting unit 23 to the function and the programs selected by the detecting process selecting unit 22 (Step S808).

As has been described above, according to Embodiment 2, for the purpose of detecting the digital watermark, the digital watermark detecting apparatus 20 is provided with means for acquiring the determination information that enables specifying the digital watermark embedding function, the image converting program, and the image processing program that have been used for the embedding process or the process parameter set therefor, and means for selecting from the determination information the detecting function, the image converting program, and the image processing program, or the detecting parameter set. With this configuration, even when the individual functions, image converting programs, and image processing programs used for the digital watermark embedding are made open, the embedded digital watermark can be detected while the condition in which alteration or deletion of the embedded digital watermark is difficult is maintained.

Further, in a case where the digital watermark embedding apparatus side manages the processing functions used for the embedding process as combination process information by means of process IDs, the digital watermark detecting apparatus side may store in advance the detecting functions, the image converting programs, the image processing programs corresponding to the process IDs, or detecting parameter sets as combination detection information in association with detection IDs. With this configuration, the digital watermark detecting apparatus can specify with ease the detecting process and detecting parameters corresponding to the embedding process from the combination detection information based on the determination information.

Further, for example, the determination information including the process ID is encrypted with a secret key, and then made open using public key cryptography. Accordingly, any person that has received a digital watermark embedding image can acquire the process ID by decrypting the determination information with the public key. As a result, only the person that knows correspondence relations of the process IDs assigned to the respective arbitrary combinations of the digital watermark embedding functions, the image converting programs, and the image processing programs prepared in advance can specify, with the decrypted process ID, a combination of the digital watermark embedding functions, the image converting programs, and the image processing programs, and detect the digital watermark embedded in the digital watermark embedding image.

Further, the digital watermark detecting apparatus may prepare in advance detecting parameter sets for the selected function(s) and the programs and assign detecting parameter IDs to the detecting parameter sets used for the detecting process, which are stored in association with the process parameter IDs of the digital watermark embedding apparatus side. On the other hand, for example, the digital watermark embedding apparatus may encrypt the determination information including the process parameter ID with a secret key, and then make the determination information open using public key cryptography. Accordingly, any person that has received a digital watermark embedding image can acquire the process parameter ID by decrypting the determination information with the public key.

As a result, only the person that knows correspondence relations of the IDs assigned to the respective parameter sets prepared in advance can specify the detecting parameter ID corresponding to the decrypted process parameter ID, and detect the digital watermark embedded in the digital watermark embedding image.

It should be noted that the combination of the digital watermark embedding apparatus 10 according to Embodiment 1 of the present invention and the digital watermark detecting apparatus 20 according to Embodiment 2 of the present invention makes it possible to obtain a digital watermark system that enables a digital watermark embedding algorithm to be made open while minimizing degradation of image quality.

What is claimed is:

1. A digital watermark embedding apparatus for embedding particular embedding information into multimedia data, comprising:
    a storing unit that stores in advance at least one embedding function, at least one image converting program, and at least one image processing program that are required for a digital watermark embedding process, and storing in advance combination process information in which a process ID is assigned to each combination of the at least one embedding function, the at least one image converting program, and the at least one image processing program;
    an embedding process selector that selects, as particular combination process information, one of a plurality of pieces of the combination process information stored in the storing unit; and
    an embedder that obtains the at least one embedding function, the at least one image converting program, and the at least one image processing program that are included in the selected particular combination process information, embeds the particular embedding information into the multimedia data, and generates determination information for determining the process ID corresponding to the particular combination process information.

2. A digital watermark embedding apparatus according to claim 1, wherein:
    the storing unit further stores in advance process parameter sets in which a process parameter ID is assigned to each combination of a plurality of parameters to be used for the at least one embedding function, the at least one image converting program, and the at least one image processing program that are required for the digital watermark embedding process;
    the digital watermark embedding apparatus further comprises an embedding parameter selector that selects, as a particular process parameter set, one of the process parameter sets stored in the storing unit; and
    the embedder is configured to:
        obtain the at least one embedding function, the at least one image converting program, and the at least one image processing program that are included in the selected particular combination process information from the storing unit;
        embed the particular embedding information into the multimedia data by means of the selected particular process parameter set; and
        generate the determination information for determining the process ID corresponding to the particular combination process information and the process parameter ID corresponding to the particular process parameter set.

3. A digital watermark embedding apparatus according to claim 1 or 2, wherein the embedder encrypts the determination information by means of a secret key.

4. A digital watermark detecting apparatus for detecting particular embedding information from multimedia data embedded with the particular embedding information by a digital watermark embedding apparatus, comprising:
    a storing unit that stores in advance at least one detecting function, at least one image converting program, and at least one image processing program that are required for a digital watermark detecting process, and storing in advance combination detection information in which a detection ID is assigned to each combination of the at least one detecting function, the at least one image converting program, and the at least one image processing program in association with determination information for specifying at least one function and program used for an embedding process by the digital watermark embedding apparatus;
    a determination information entering unit that acquires the determination information made at a time of the embedding process performed by the digital watermark embedding apparatus with respect to the multimedia data;
    a detecting process selector that selects, based on the determination information, one of a plurality of pieces of the combination detection information stored in the storing unit as particular combination detection information; and
    a detector that obtains, from the storing unit, the at least one detecting function, the at least one image converting program, and the at least one image processing program that are included in the selected particular combination detection information, and extracts the particular embedding information from the multimedia data.

5. A digital watermark detecting apparatus according to claim 4, wherein:
    the storing unit further stores in advance detecting parameter sets in which a detecting parameter ID is assigned to each combination of a plurality of parameters to be used for the at least one detecting function, the at least one image converting program, and the at least one image processing program that are required for a digital watermark detecting process in association with the determination information for determining parameters of the at least one function and the programs used for the embedding process by the digital watermark embedding apparatus;
    the determination information entering unit acquires the determination information for determining the at least one function, and at least one image converting program, and at least one image processing program, and the parameters used for the embedding process performed by the digital watermark embedding apparatus with respect to the multimedia data;
    the digital watermark detecting apparatus further comprises a detecting parameter selector that selects, based on the determination information, one of the detecting parameter sets stored in the storing unit as a particular detecting parameter set; and the detector is configured to:
obtain the at least one detecting function, the at least one image converting program, and the at least one image processing program that are included in the selected particular combination detection information from the storing unit; and
extract the particular embedding information from the multimedia data by means of the selected particular detecting parameter set.

6. A digital watermark detecting apparatus according to claim 4 or 5, wherein the determination information entering unit acquires, in a case where the determination information is encrypted with a secret key, an after-decryption determination information which has been decrypted with a public key.

7. A digital watermark system comprising:
a digital watermark embedding apparatus for embedding particular embedding information into multimedia data, including
a storing unit that stores in advance at least one embedding function, at least one image converting program, and at least one image processing program that are required for a digital watermark embedding process, and storing in advance combination process information in which a process ID is assigned to each combination of the at least one embedding function, the at least one image converting program, and the at least one image processing program,
an embedding process selector that selects, as particular combination process information, one of a plurality of pieces of the combination process information stored in the storing unit, and
an embedder that obtains the at least one embedding function, the at least one image converting program, and the at least one image processing program that are included in the selected particular combination process information, embeds the particular embedding information into the multimedia data, and generates determination information for determining the process ID corresponding to the particular combination process information; and
a digital watermark detecting apparatus for detecting particular embedding information from multimedia data embedded with the particular embedding information by the digital watermark embedding apparatus, including
a storing unit that stores in advance at least one detecting function, at least one image converting program, and at least one image processing program that are required for a digital watermark detecting process, and storing in advance combination detection information in which a detection ID is assigned to each combination of the at least one detecting function, the at least one image converting program, and the at least one image processing program in association with determination information for specifying at least one function and program used for an embedding process by the digital watermark embedding apparatus,
a determination information entering unit that acquires the determination information made at a time of the embedding process performed by the digital watermark embedding apparatus with respect to the multimedia data,
a detecting process selector that selects, based on the determination information, one of a plurality of pieces of the combination detection information stored in the storing unit as particular combination detection information, and
a detector that obtains, from the storing unit, the at least one detecting function, the at least one image converting program, and the at least one image processing program that are included in the selected particular combination detection information, and extracts the particular embedding information from the multimedia data.

8. A digital watermark embedding method, implemented on a digital watermark embedding apparatus for embedding particular embedding information into multimedia data, the method comprising:
storing in advance, by a storing unit of the digital watermark embedding apparatus, at least one embedding function, at least one image converting program, and at least one image processing program that are required for a digital watermark embedding process, and storing in advance combination process information in which a process ID is assigned to each combination of the at least one embedding function, the at least one image converting program, and the at least one image processing program;
selecting, by the digital watermark embedding apparatus, as particular combination process information, one of a plurality of pieces of the combination process information stored in the storing unit; and
obtaining, by the digital watermark embedding apparatus, the at least one embedding function, the at least one image converting program, and the at least one image processing program that are included in the selected particular combination process information, embedding the particular embedding information into the multimedia data, and generating determination information for determining the process ID corresponding to the particular combination process information.

9. A digital watermark detecting method, implemented on a digital watermark detecting apparatus for detecting particular embedding information from multimedia data embedded with the particular embedding information by a digital watermark embedding apparatus, the method comprising:
storing in advance, by a storing unit of the digital watermark detecting apparatus, at least one detecting function, at least one image converting program, and at least one image processing program that are required for a digital watermark detecting process, and storing in advance combination detection information in which a detection ID is assigned to each combination of the at least one detecting function, the at least one image converting program, and the at least one image processing program in association with determination information for specifying at least one function and program used for an embedding process by the digital watermark embedding apparatus;
acquiring, by the digital watermark detecting apparatus, the determination information made at a time of the embedding process performed by the digital watermark embedding apparatus with respect to the multimedia data;
selecting, by the digital watermark detecting apparatus, based on the determination information, one of a plurality of pieces of the combination detection information stored in the storing unit as particular combination detection information; and
obtaining, by the digital watermark detecting apparatus, from the storing unit, the at least one detecting function, the at least one image converting program, and the at least one image processing program that are included in the selected particular combination detection information, and extracting the particular embedding information from the multimedia data.

* * * * *